Jan. 21, 1947.  G. E. PRICE  2,414,667
HEATING APPARATUS
Filed Jan. 1, 1943  3 Sheets-Sheet 1

WITNESSES:
Geo. H. Enwall.

INVENTOR
GEORGE E. PRICE
BY R. J. Eisinger
ATTORNEY

Jan. 21, 1947.  G. E. PRICE  2,414,667
HEATING APPARATUS
Filed Jan. 1, 1943  3 Sheets-Sheet 2
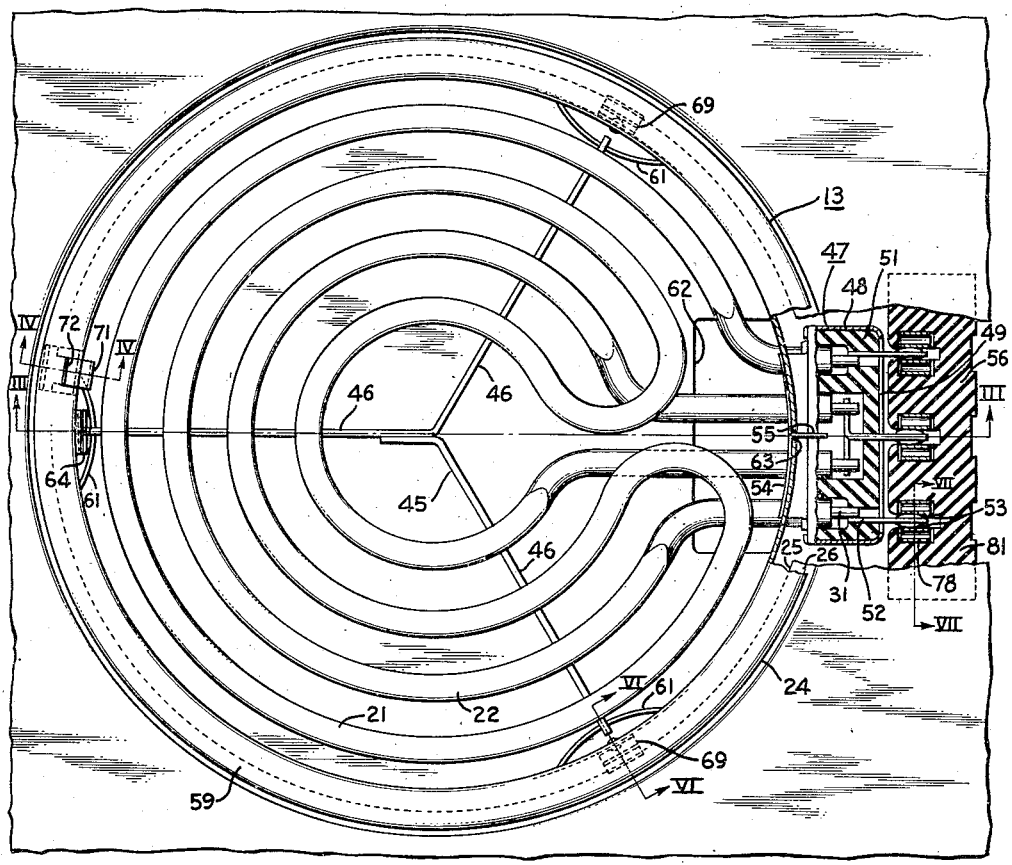
FIG. 2
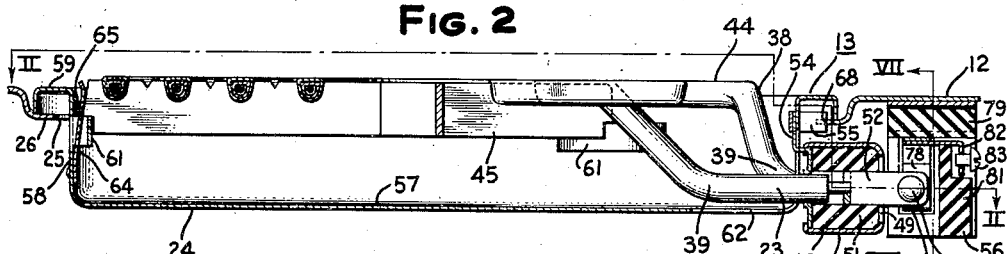
FIG. 3
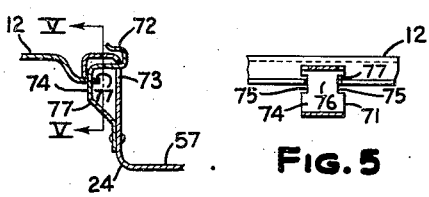
FIG. 4    FIG. 5
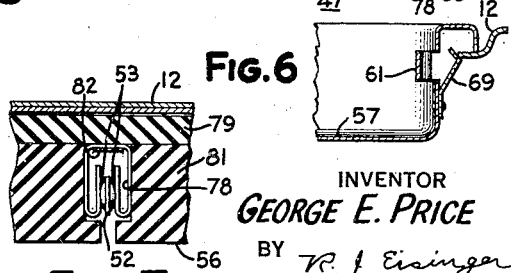
FIG. 6
FIG. 7
INVENTOR
GEORGE E. PRICE
BY R. J. Eisinger
ATTORNEY Patented Jan. 21, 1947

2,414,667

UNITED STATES PATENT OFFICE 2,414,667

HEATING APPARATUS

George E. Price, Mansfield, Ohio, assignor to Westinghouse Electric Corporation, East Pittsburgh, Pa., a corporation of Pennsylvania Application January 1, 1943, Serial No. 470,993

2 Claims. (Cl. 219—37)

This invention relates to heating appliances and particularly to surface heating units for ranges or the like, and it has for an object to provide an improved device of the character set forth.

It is an object of the present invention to provide an improved range surface unit embodying a plurality of heating elements, connectible in a plurality of circuit arrangements to provide different heats, in which good distribution of heat is obtained regardless of the heat output of the unit.

It is another object of the invention to provide an improved range surface unit employing a plurality of heating elements of different heating capacity or wattage rating in which the wattage per unit area of the effective heating surface of the elements is substantially the same for each element.

It is a further object of the invention to provide an improved range surface until employing tubular sheathed heating elements wherein the elements are arranged to provide substantially uniform distribution of heat over a substantially circular area.

It is another object of the invention to provide improved means for connecting and disconnecting a removable electric range surface unit to the conductors which supply electricity to the unit.

It is also an object of the invention to provide improved means for centering and latching a removable electric range surface unit in a range platform.

These and other objects are effected by the invention as will be apparent from the following description and claims taken in connection with the accompanying drawings, forming a part of this application, in which:

Fig. 2 is a plan view, with portions broken away, of one of the surface units of the range illustrated in Fig. 1;

Fig. 3 is a sectional view taken substantially along the line III—III of Fig. 2;

Fig. 4 is a sectional view taken substantially on the line IV—IV of Fig. 2;

Fig. 5 is a sectional view taken substantially on the line V—V of Fig. 4;

Fig. 6 is a sectional view taken substantially on line VI—VI of Fig 2;

Fig. 7 is a sectional view taken substantially on line VII—VII of Fig. 2;

Figure 1:
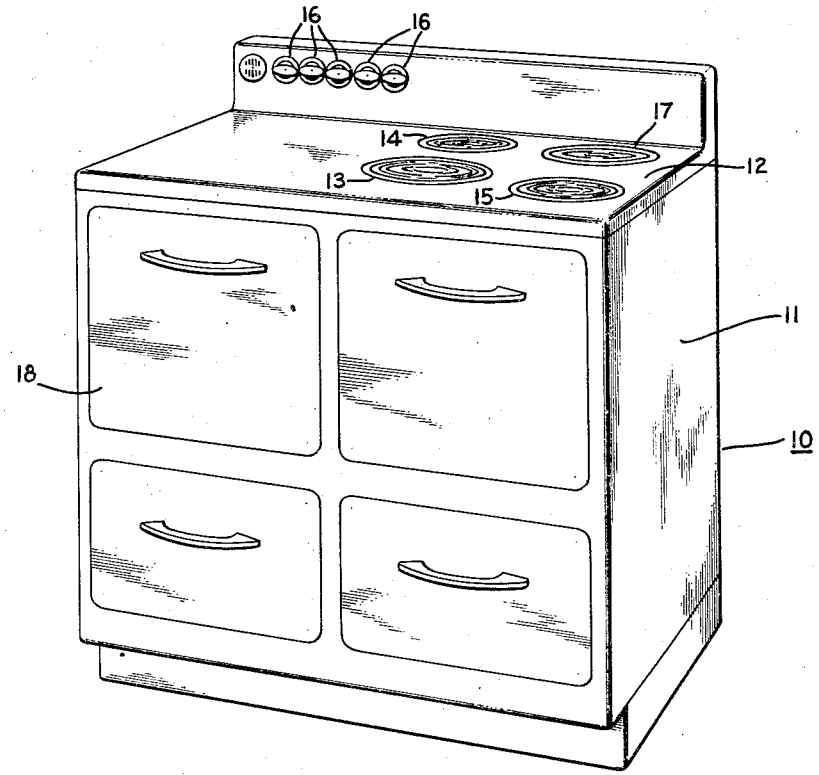
Fig. 1 is a perspective view of an electric cooking range in which the present invention is incorporated.

Referring to the drawings and particularly to Fig. 1, the electric range there shown and generally indicated 10, except as hereinafter pointed out, may be of conventional construction and includes a body portion 11 and a cooking platform 12. The platform has mounted therein, in a manner to be described in detail later, a plurality of surface units, generally indicated 13, 14, and 15, the energization of which is controlled by means of switch knobs 16, here shown as mounted in the backsplasher of the platform. If desired, the range may also be provided with a deep well cooker 17 and an oven (not shown) accessible through a door 18. The heating elements for the deep well cooker 17 and the oven may also be controlled by certain of the knobs 16, as well understood in the art.

In the remaining figures of the drawings, there is shown in detail the range surface unit 13, it being understood that the other surface units 14 and 15 may be identical with unit 13. The surface unit 13 generally comprises a pair of electric heating elements 21 and 22, coiled in the manner shown in Figs. 9 and 10, the ends 23 thereof being brought out at one side and below the main plane of the heating elements, as shown in Fig. 3, and a metallic drip or reflector pan 24 in which the heating elements are removably nested. The reflector pan with the heating elements therein is removably latched in an opening 25 provided in the platform 12. The margin of the platform surrounding this opening may be offset downwardly, as shown particularly in Fig. 3, to provide a supporting flange 26 for the surface unit.

While the reflector pan is shown as removable from the platform, it is to be understood that the same may be permanently attached to the platform, as by welding, or formed integrally therewith, as disclosed in my copending application Serial No. 431,212, filed February 17, 1942, and assigned to the assignee of the present invention.

Figure 11:
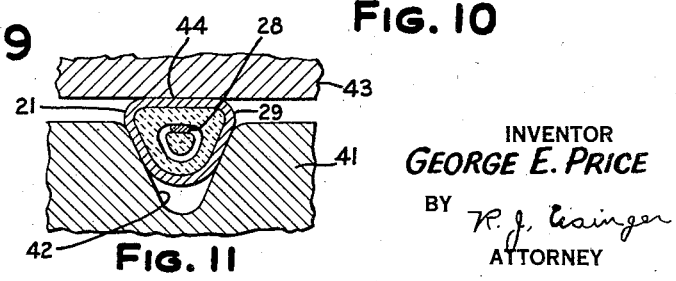
Fig. 11 is a sectional view taken substantially on the line XI—XI of Fig. 8 and showing the dies employed for flattening the heating elements; and, Figs. 12, 13, and 14 are sectional views, on a reduced scale, illustrating the manner of removing and inserting the surface unit in the range platform.

The heating elements 21 and 22 each comprise a helically coiled, electrical resistance element 28 (Fig. 11) supported within a metallic tubular sheath 29, by means of highly-compacted heatconducting electrical insulating material, such as magnesium oxide, which maintains the resistance element in spaced concentric relation within the sheath.

The sheathed heating elements 21 and 22 are initially formed from straight lengths of round tubing in which the resistance wires 28 and their respective terminal rods 31 are insulatedly mounted in a manner well known in the art. The elements 21 and 22 are identical in all respects, except that the element 21 is longer than element 22 and therefore has a higher wattage or heating capacity although the wattage per unit area of the sheath or tubing surface of each element is substantially identical to provide elements of substantially equal life. After the resistance wires 28 and their terminal rods 31 have been mounted in the straight lengths of tubing and the tubing swaged or otherwise reduced in diameter to compact the insulation, the elements 21 and 22 are coiled into the pattern shown in Figs. 9 and 10, to provide inner circular portions or convolutions 32 and 33, respectively, and outer circular portions 34 and 35, respectively, which are joined at one end by bends 36 and 37 located substantially in the middle of each tube and disposed adjacent the terminal ends 23. The terminal ends 23 are bent down at the points 38 and then outwardly at 39 to provide horizontal portions which are disposed in a common plane as shown in Fig. 3. The terminal rods 31 preferably extend approximately to the points 38 so that the bent terminal ends are relatively cool.

Figure 8:
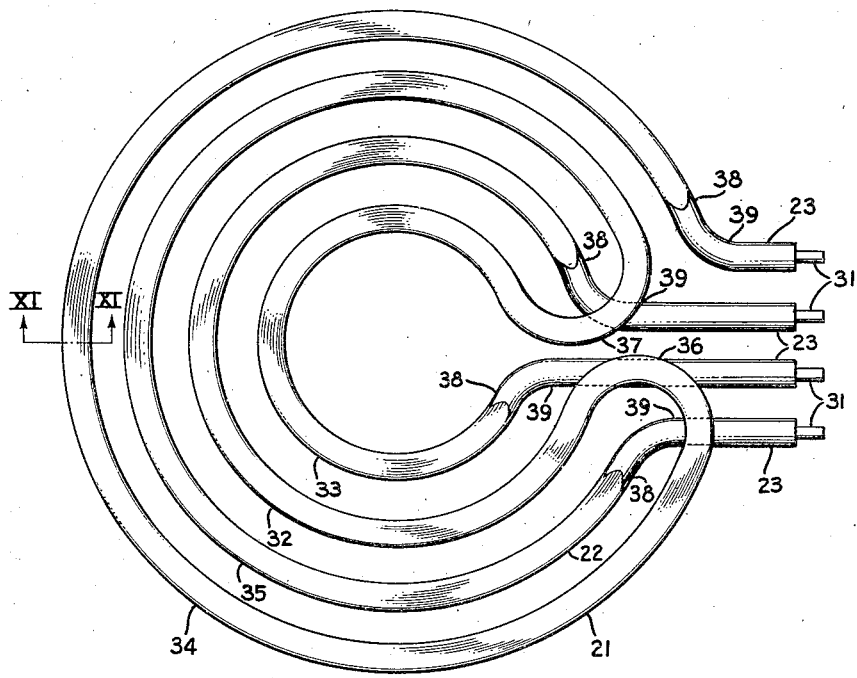
Fig. 8 is a plan view of the heating elements of the unit illustrated in Fig. 2.
Figures 9, 10:
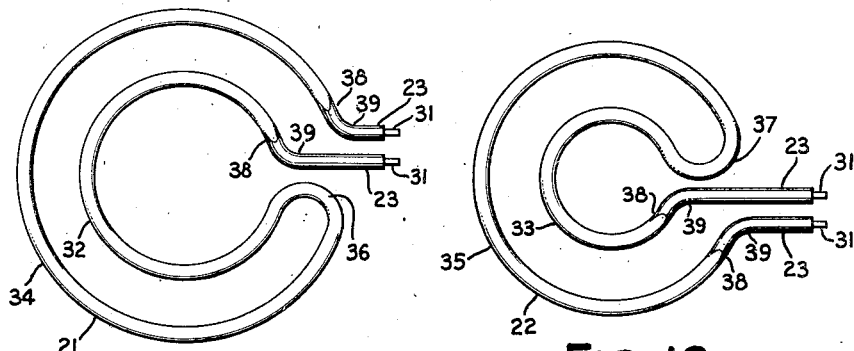
Figs. 9 and 10 are plan views of the large and small heating elements, respectively.

The elements 21 and 22 are formed left and right hand, as shown in Figs. 9 and 10, and the diameters of their inner and outer convolutions are such that the two elements can be assembled, as shown in Fig. 8, with the outer circular portion 35 of the small element 22 disposed substantially in the center of the space between the concentric portions 32 and 34 of the large element 21 and with the inner circular portion 33 of the small element disposed within the inner circular portion 32 of the large element 21.

When the two elements are assembled, the bend 36 of the large element 21 overlies the ends 23 of the small element 22 and prevents a cold spot in the surface unit at this region. Similarly, the bend 37 of the small element 22 overlies one of the ends 23 of the large element 22 to further prevent any appreciable cold spot in the substantially circular heating area defined by the combined elements.

It will be appreciated that by forming the elements in the manner described above, a substantially circular heating area is provided which is substantially devoid of cold spots and conforms to conventional circular pots and pans. Further, since the elements are interlaid or nested one within the other, the heat from either element, when it alone is energized, is distributed over a greater area than if the small element 22 were disposed entirely within the inner convolution 32 of the large element 21.

To further increase the heating efficiency of the unit, the elements are flattened after coiling them into the patterns of Figures 9 and 10, by means of suitable dies which may comprise a bottom plate 41 (Fig. 11) having a V-shaped groove 42 arranged in a pattern corresponding to the coiled elements, and a pressure plate 43. Flattening of the elements in this manner provides a substantially triangular cross-sectional shape to the elements, resulting in a broad, flat upper heating surface 44.

The armored heating elements are adapted to be supported in fixed spaced relation in any suitable manner as by a metal spider 45 having notches provided along the upper edges of the arms 46 of the spider in which the elements are gripped.

The ends 23 of the elements 21 and 22 extend into a terminal guard 47, comprising a rectangular metallic box 48 brazed or welded to the sheath of the elements and open at 49. A block 51 of insulating material disposed in the box 48 has suitable recesses and holes to receive the terminal ends of the heating elements. The projecting ends of the terminal rods 31 are provided with rigid conductor straps or knife blade members 52 which may be welded thereto and provided at their free ends with contact buttons 53 having spherical contact surfaces. The terminal rods of the inner ends of the elements 21 and 22 are connected together by a single conductor strap as shown in Fig. 2, providing three knife blade members 52 for connection to a three-wire supply source as will appear later.

The terminal guard 47 has fixed thereto an upstanding bracket 54 which is arcuate in plan, as shown in Fig. 2, and provided with a guide finger 55. As will appear later, this finger serves to center the heating elements with respect to the reflector pan 24 and a terminal receptacle 56 carried by the platform for the reception of the knife blade contact buttons 53.

The reflector pan 24 comprises a bottom wall 57 and a continuous side wall 58, the upper edge of which is turned outwardly to provide a flange 59 adapted to rest on the flange 26 of the platform 12. The side wall 58 of the reflector pan is provided with struck-in portions or lugs 61 on which the outer ends of the arms 46 of the spider 45 are adapted to rest to support the flat heating surface 44 of the heating elements slightly above the top of the flange 59 and the platform 12. It will be understood that cooking vessels rest directly on the surface 44 of the heating elements.

The side and bottom walls of the reflector pan 24 are provided with an opening 62, which is of a size to permit the terminal guard 47 to be passed therethrough. A notch 63 extending upwardly from this opening toward the rim of the pan is adapted to receive the guide finger 55.

As shown particularly in Figs. 2 and 3, a latch spring 64 may be spot-welded or otherwise secured at one end to the inner surface of the side wall 58 of the pan and provided with an opening for receiving a reduced projecting end 65 of the adjacent spider arm to latch the heating elements and their supporting spider in the pan. When it is desired to remove the heating elements from the pan, it is necessary only to press the free upper end of the latching spring 64 outwardly to disengage the spring from the projection 65. While the latching arrangement has been shown applied to only one arm of the spider, it will be appreciated that the same may be applied to each of the arms thereof, if desired.

Figures 12, 13:
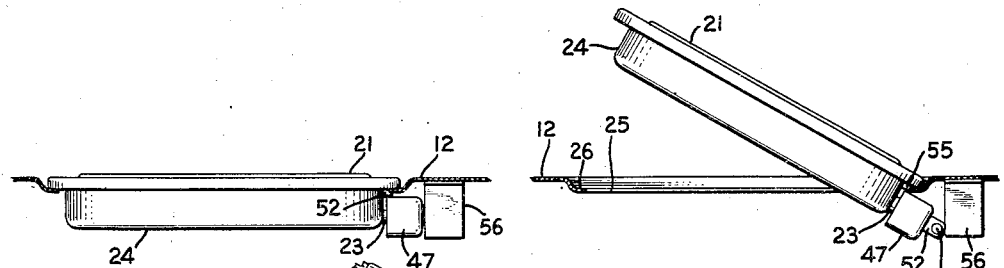
Figure 14:
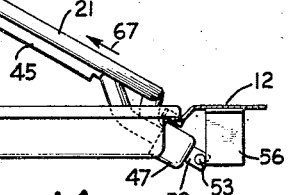

The manner of assembling the heating elements 21 and 22 in the reflector pan 24 and the complete surface unit in the platform 12 has been shown in Figs. 12, 13, and 14. To assemble the heating elements 21 and 22 and their supporting spider in the reflector pan 24, the heating elements are tilted at an angle between 30 and 45 degrees with respect to the plane of the reflector pan and the terminal guard 47 inserted through the opening 62 to bring the guide finger or tongue 55 in the notch 63. In this position, the upper edge of the bracket 54 rests on or engages the inner surface of the side wall of the pan, while the finger 55, by its engagement in the notch 63, definitely positions the heating element with respect to the pan so that the same may then be swung downward into nesting relation within the pan, and with the free ends of the spider resting on the supporting lugs 61. In swinging the surface unit into the pan in the manner described above, the projecting end 65 of the spider forces the latch spring 64 outwardly until the end 65 slips into the opening provided in the latch spring, to lock the surface unit in position. To remove the surface unit from the reflector pan, the above procedure is reversed, the latch 64 being released and the surface unit swung up to the position shown in Fig. 14 and the surface unit then removed in the direction indicated by the arrow 67.

In order to guide the surface unit into the platform opening 25, the flange 26 of the platform is provided with a notch 68 (Fig. 3) which, in function, corresponds to the notch 63 provided in the reflector pan. With the heating element nested in the reflector pan or, if desired, the reflector pan may be disposed in the platform as shown in Fig. 14, the surface unit is brought to the platform and tilted at an angle between 30 and 45 degrees to the plane of the platform and held so that the finger or tongue 55 is engaged in the notch 68 of the platform flange 26, and with the outer edge of the reflector pan rim resting on the upper surface of this flange. This position of the surface unit with respect to the platform is shown in Fig. 13. The surface unit is then swung downwardly about the fulcrum point provided by the engagement of the reflector pan rim with the flange 26 adjacent the notch 68, until the surface unit is in the position shown in Fig. 12. To remove the surface unit from the platform, the above assembly operations are reversed.

In order to center the surface unit and to hold it in the platform and prevent it from shifting in the platform opening, a plurality of springs 69 may be fixed to the outer surface of the side wall of the reflector pan in a position to engage the edge of the platform, as shown in Fig. 6. A latch spring 71 mounted on the pan at a point opposite the terminal guard receiving opening 62 also serves to center the surface unit and to latch the surface unit to the platform. The spring 71, as shown in Fig. 4, is provided with a handle portion 72 extending through an opening 73 in the reflector pan which may be engaged by the operator's finger for manipulating the spring. The vertical portion 74 of the spring is provided with opposed notches 75, as shown in Fig. 5, so that the resulting narrow strip 76 may be removably received in a notch 77 provided in the platform flange to latch the reflector pan into the platform.

The terminal receptacle 56 is mounted on the under range, and is preferably secured to the under surface of the platform 12, in such a position that as the surface unit is swung into and out of the platform opening 25, the contact buttons 53 thereof engage female contact clips 78 provided in the terminal receptacle, as shown in Figs. 2 and 7.

The terminal receptacle comprises a top plate 79 and a lower slotted block 81, each of insulating material, bolted or otherwise suitably secured to the platform. The contact clips 78 comprise inverted U-shaped springs fixed to terminal plates 82 bent down at their outer ends and provided with apertures to receive screws 83 to which the supply conductors are connected. The U-shaped clips 78 are preferably made of light-weight spring material such as "Z" nickel, Monel, Inconel, or silver surfaced spring metal, and each of them depends into an enlarged recess in the block 81. The contact clips 78 have limited movement in these recesses since the terminal plates 82 are slidable on the block 81 in a space provided between this block and the top plate 79.

As the heating element is swung into and out of the platform opening, in the manner described above, the contact buttons 53, which are preferably made of Monel metal having their spherical heads coated with silver, swing into and out of engagement with clips 78 to make and break the circuit connection. By employing spherical head contact buttons, good electrical contact with the female clips is obtained and friction between the contact buttons and the clips is reduced to a minimum so that the surface unit may be easily removed and inserted in the platform.

While the invention is not limited thereto, it is preferred to employ heating elements of unequal wattage but in which the wattage per unit area of the small and large element is substantially the same and to selectively connect the elements to a three-wire supply source by means of a suitable switch (not shown) to provide seven degrees of heat. While more than seven degrees of heat are obtainable with the two elements of unequal wattage, it is believed seven heats are sufficient to perform all cooking operations.

The surface units are preferably either six or eight inches in diameter, having outputs of approximately 1300 and 2200 watts, respectively. Heating elements 21 and 22 having outputs of 750 watts and 550 watts, respectively, for a six-inch unit and outputs of 1300 watts and 900 watts, respectively, for an eight-inch unit may be connected to a three-wire supply source to provide the heats listed in the following table. It is to be noted that these heats are well balanced to provide substantially any degree of heat necessary to perform all cooking operations.

|  | 6-inch unit | 8-inch unit |
| --- | --- | --- |
|  | Watts | Watts |
| High | 1,300 | 2,200 |
| High medium | 750 | 1,300 |
| Medium | 550 | 900 |
| Medium low | 317.5 | 532 |
| Low | 187.5 | 325 |
| Fast simmer | 137.5 | 225 |
| Simmer | 79 | 133 |

These heats are obtained by connecting the elements in the following manner:

(1) High—Both heating elements in parallel across 230 volts.
(2) High medium—Large element 21 across 230 volts.
(3) Medium—Small element 22 across 230 volts.
(4) Medium low—Both heating elements in series across 230 volts.
(5) Low—Large heating element 21 across 115 volts.
(6) Fast simmer—Small heating element 22 across 115 volts.
(7) Simmer—Both elements in series across 115 volts.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. An electric surface heating unit comprising a larger and a smaller sheathed heating element, said heating elements including circular portions disposed concentrically in substantially a common plane, the ends of the heating elements being disposed to one side of the unit, the larger element extending from one end thereof radially inwardly, then circularly in one direction to form an outer circular portion, then radially inwardly to form a connecting portion, then circularly in the opposite direction to form an inner circular portion, then downwardly and radially outwardly to the other end thereof, the smaller heating element extending from one end thereof radially inwardly to within the inner circular portion of the larger element, then circularly in said opposite direction to form an inner circular portion, then radially outwardly to form a connecting portion overlying the adjacent portion of the larger element, then circularly in said one direction between the circular portions of the larger element to a point adjacent the connecting portion of the larger element to form a circular portion, then downwardly and under the adjacent portion of said larger element and radially outwardly to the other end thereof.

2. An electric surface heating unit comprising a larger and a smaller sheathed heating element, said heating element including circular portions disposed concentrically in a substantially common plane, the larger element extending circularly in one direction to form an outer circular portion, then radially inwardly to form a connecting portion, then circularly in the opposite direction to form an inner circular portion and then downwardly, the smaller heating element extending, within the inner circular portion of the larger element circularly in said opposite direction to form an inner circular portion, then radially outwardly between the ends of the inner circular portion of the larger element to form a connecting portion, then circularly in said one direction between the circular portions of the larger element to a point adjacent the connecting portion of the larger element to form a circular portion and then downwardly.

GEORGE E. PRICE.